Figure 1:
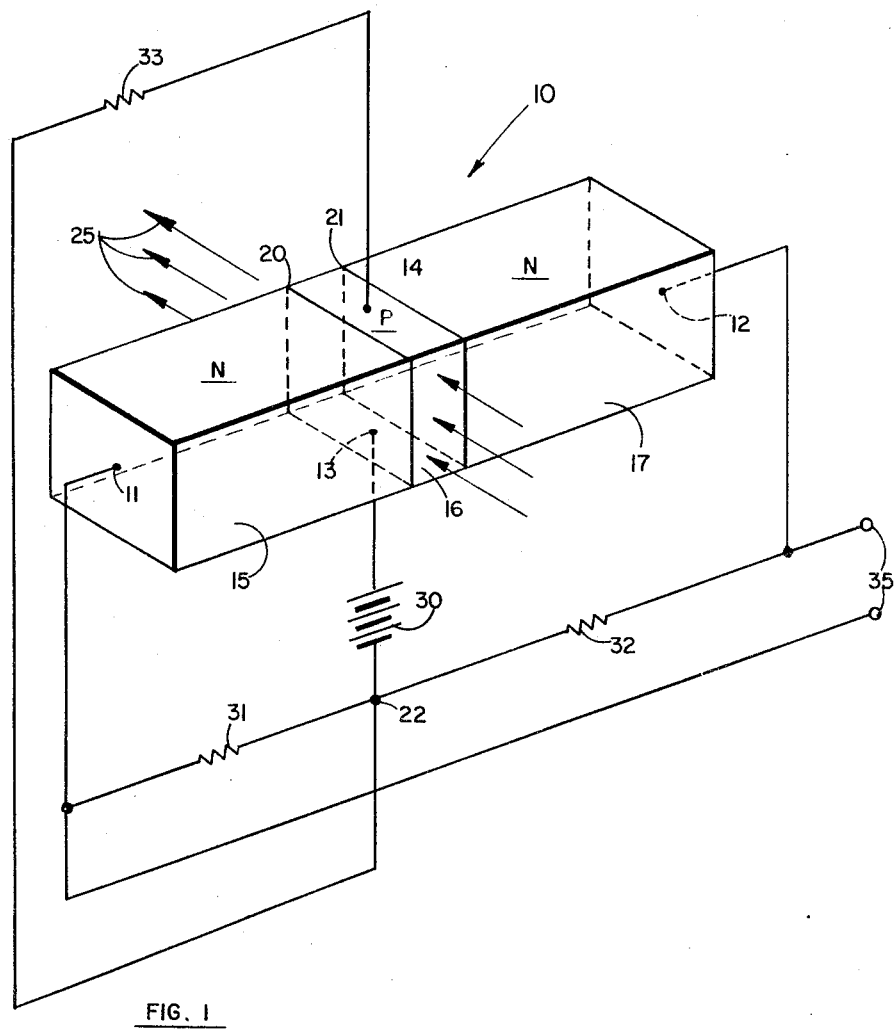

Dec. 20, 1966  YUJIRO YAMAMOTO  3,293,541
MAGNETIC SENSING DEVICE

Filed April 2, 1964  2 Sheets-Sheet 1

*INVENTOR.*
YUJIRO YAMAMOTO

BY

ATTORNEY

United States Patent Office 3,293,541
Patented Dec. 20, 1966

3,293,541
MAGNETIC SENSING DEVICE
Yujiro Yamamoto, Santa Ana, Calif., assignor to
North American Aviation, Inc.
Filed Apr. 2, 1964, Ser. No. 356,857
1 Claim. (Cl. 323—94)

The present invention relates generally to a magnetic sensing device and more specifically to a semiconductive device for producing an output signal, the amplitude of which is a linear function of magnetic flux density.

In the recent past, extensive studies have been made of magnetic sensors using semiconductive materials. Hall-effect devices are an example; specially constructed resistive elements are another. These devices respond directly to magnetic flux rather than to the rate of change of flux. Many of these devices may be employed to read recorded signals, but only in the very low kilocycle frequency range. In many instances the limiting factor is the "gap" width of the device across which the recorded signal is sensed. The gap limitation of these devices may be compared to the gap limitation of a conventional type magnetic read head consisting of a magnetic core having a sensing coil wound around it. In such a conventional read head, the losses are proportional to the ratio of the gap width to the wave length of the recorded signal. Accordingly, the high frequency response of the device is limited by its gap width. For a good output signal, the gap width should be no more than one-tenth the wave length of the highest frequency signal to be read.

An object of this invention is to provide an improved magnetic field sensing device.

Another object of this invention is to provide a high resolution device for measuring magnetic fields.

Another object is to provide a semiconductive device having a pair of junctions across which the conduction of current is proportional to the flux density of an applied magnetic field.

A further object is to provide a magnetic sensing device having a narrow gap width for sensing high frequency signals.

These and other objects may be achieved through the use of at least one properly biased PN junction of a semiconductive device. It has been discovered that a magnetic effect occurs in a junction of a semiconductive device a portion of which junction is forward-biased while the remaining portion is back-biased. The back-biased portion of such a junction will vary directly with a change in magnetic flux density. In a preferred embodiment, a PNP or NPN semiconductive device is provided with two junctions, each connected to a biasing circuit to back-bias a portion of each such that the current through forward-biased portions thereof are equal in the absence of an applied magnetic field. When a magnetic field of a given polarity is applied, the back-biased portions of the junctions are changed. As a result, the currents through the two junctions change oppositely. The amplitude of the difference between the two currents is the measure of the magnetic flux density and the sense of the difference is an indication of the polarity of the applied magnetic field.

Figure 4:
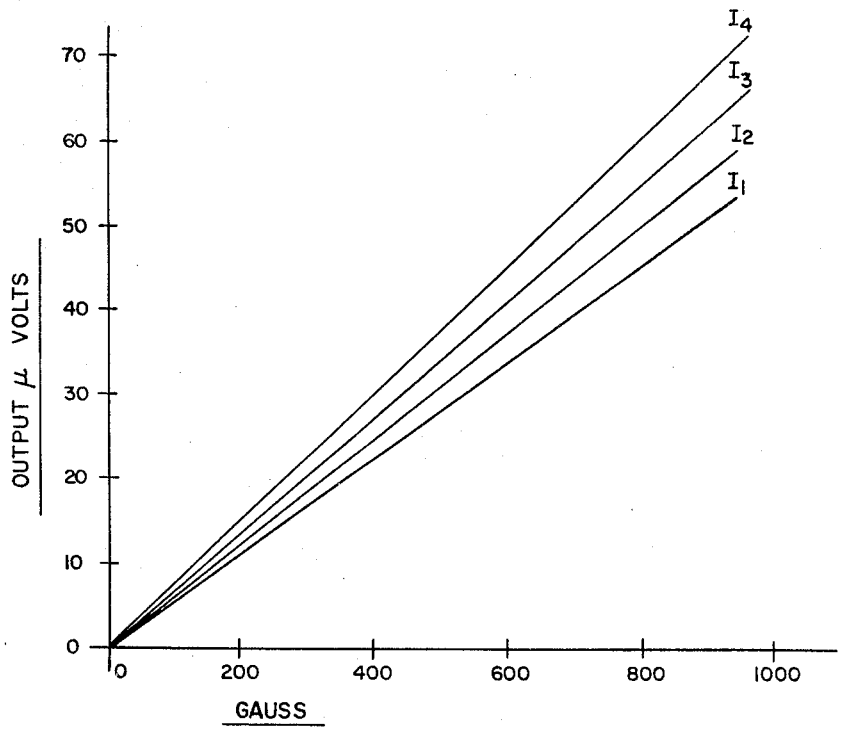
Figure 2:
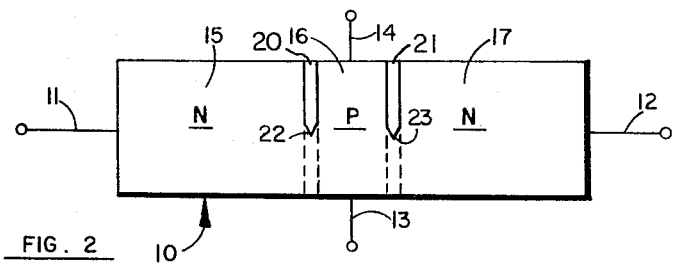
Figure 3:
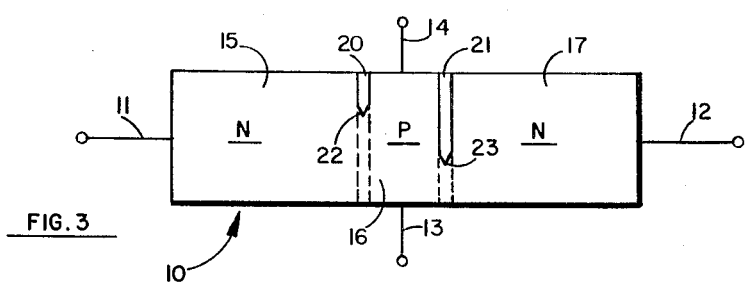

Other objects and advantages of this invention will become apparent from the following description with reference to the accompanying drawings in which:

FIG. 1 is an orthographic view of the preferred embodiment of this invention;

FIG. 2 schematically illustrates the equally back-biased portions of two junctions in the preferred embodiment illustrated in FIG. 1;

FIG. 3 illustrates a change in the two back-biased portions of the junctions shown in FIG. 2 in response to an applied magnetic field of a given polarity; and FIG. 4 illustrates the linear relationship between the flux density of an applied magnetic field and the output signal of the preferred embodiment illustrated in FIG. 1.

Referring to FIG. 1, a magnetic sensing device 10 is shown having four terminals 11, 12, 13 and 14 connected to three portions 15, 16 and 17 of N, P and N semiconductive material, respectively, to provide two PN junctions 20 and 21.

It should be understood that a NPN configuration has been arbitrarily chosen for purposes of illustration. A PNP configuration could have been employed just as well by reversing the polarity of the bias potential applied to of the power supply 30 and the terminal 14.

The NPN device is connected in a circuit as shown in FIG. 1 in order to bias the terminals 11 and 12 negatively with respect to terminal 13, and provide forward-biased junctions at least along the lower portions of the junctions 20 and 21. The terminal 14 is also biased negatively with respect to terminal 13 as well as terminals 11 and 12 to provide back-biased junctions along the upper portions of the junctions 20 and 21.

The biasing is accomplished by means of a power supply 30 the positive terminal of which is connected to the terminal 13 and the negative terminal to impedance elements 31 and 32 which are serially connected to the terminals 11 and 12, respectively. A third impedance element 33 is connected between the negative terminal of the power supply 30 and the terminal 14.

The power supply 30 serves two functions when connected in that manner. It provides the required potential at both end terminals 11 and 12 to bias the upper and lower portions of the junctions 20 and 21 oppositely. It also provides bias current through the center portion 16 of the device. The impedance elements 31 and 32 are approximately equal in resistance whereas the impedance element 33 is smaller than the elements 31 and 32 in resistance value. This arrangement results in the desired forward-biased relation across the lower portions of the junctions 20 and 21 between the terminal 13 and the two end terminals 11 and 12, as described hereinbefore, and also provides for the reversed biased relation across the remaining upper portions of the two junctions 20 and 21 between terminal 14 and the two end terminals 11 and 12.

Magnetic flux, or the component thereof, passing through the sensing device 10 parallel to the junctions 20 and 21 and perpendicular to the current path between terminals 13 and 14 is represented by flux lines 25. The effect of the magnetic flux is to change forward-biased portions of the two junctions unequally, the sense of the inequality depending on the polarity or direction of the flux, and the magnitude of the inequality depending upon the flux density of the magnetic field. Thus the currents passing through resistive elements 31 and 32 are unequal when a magnetic field is applied. A differential amplifier, or a similar circuit or device, may be connected across output terminals 35 to detect the sense and magnitude of that inequality, and therefore the sense and magnitude of the magnetic flux passing through the "gap" between the junctions 20 and 21 of the device 10.

In operation, current flows through the center portion 16 between the terminals 13 and 14 and through the forward-biased portions of junctions 20 and 21 between the terminal 13 and the terminals 11 and 12, but not between terminal 14 and the terminals 11 and 12 since the upper portions of the junctions 20 and 21 are back-biased as schematically represented by double solid lines in FIG. 2, while the lower portions are forward-biased as represented by double dotted lines. Had a PNP configuration been chosen for the semiconductive device 10, the relative potential relationships between the terminals 11, 12, 13 and 14 would have been reversed in the circuit of FIG. 1 as noted hereinbefore, thereby maintaining the junctions 20 and 21 biased in the same manner, but providing currents in the opposite directions.

FIG. 2 shows the sensing device 10 with the junctions 20 and 21 partially back-biased. The length of the back-biased portions is a function of the bias current passing by the junctions through the center portion 16 between terminals 13 and 14. The back-biased conditions of junctions 20 and 21 fade into the forward-biased condition at points 22 and 23. Thus, point 22 indicates where the potential along the path between terminals 11 and 13 becomes equal to the potential of path between terminals 11 and 14. Point 23 similarly indicates where the potential along the path between terminals 12 and 13 becomes equal to the potential of the path between terminals 12 and 14.

The magnetic sensing device 10 is provided with an extremely small gap or center portion 16 in order to obtain an accurate measurement of magnetic flux over a very small area. Using present techniques of fabricating semiconductive devices, the gap could be reduced to a width on the order of a few microns. To make ohmic contacts between such a narrow portion 16 and the terminals 13 and 14, the center portion 16 may be extended into a pad of suitable dimensions and depth, as by diffusing suitable impurities on the two sides around the point where contacts are to be made.

In FIG. 3, the device is shown with the back-biased portions changed under the influence of magnetic flux passing through the device parallel with the two junctions 20 and 21, and perpendicular to the current path between terminals 13 and 14 but opposite the direction shown in FIG. 1. The Lorentz force established by the magnetic field acts upon the charged carriers flowing between terminals 13 and 14, causing them to redistribute themselves along the right side of the portion 16 near the junction 21, thereby creating a potential difference between the junctions 20 and 21 in the immediate vicinity of points 22 and 23 in the center portion 16. This imbalance of the potential distribution across the center portion 16 causes the location of points 22 and 23 to be shifted in opposite directions. Thus, with the direction of the magnetic flux opposite the direction shown in FIG. 1, point 22 shifts in the direction of terminal 14, and point 23 shifts in the direction of terminal 13 as shown in FIG. 3. The effect is a decrease in the forward biased portion of the junction 21, thereby decreasing the current passing between terminals 12 and 13 and an increase in the forward biased portion of the juncture 20 thereby increasing the current passing through terminals 11 and 13.

FIG. 4 shows a graphic representation of actual measurements with a magnetic sensing device biased as shown in FIG. 1. The graph indicates a relatively linear response to equal increments of magnetic flux and output voltage. Sensitivity is increased by increasing the current between terminals 13 and 14, as indicated by the linear outputs labeled $I_1$, $I_2$, $I_3$ and $I_4$ for different currents of 20, 40, 60 and 80 microamps, respectively. Sensitivity may also be increased by decreasing the gap width, as suggested hereinbefore; by decreasing the length of the center portion between terminals 13 and 14; by increasing the internal impedance of P material or by any combination of these. The proportions of the device shown in FIG. 1 are intended to be illustrative only. The desired output characteristics of a device for a given application will actually determine the proportions and other parameters.

The Lorentz force is defined as that force experienced by a charge $dp$ moving with a velocity $v$ through a steady magnetic field of flux density B in accordance with the following equation:

$$F = dq(vB)$$

The direction of that force is orthogonal to both the direction of the magnetic field B and the direction of the velocity vector of the moving charge $dq$. For instance, if the direction of the magnetic field were opposite that shown in FIG. 1, the direction of the force world be to the left; therefore, its effect on the junctions 20 and 21 would be as shown in FIG. 3.

The graph of FIG. 4 shows the linear relationship between the applied magnetic field intensity and the voltage at the output terminals 35 for a magnetic field of a given polarity such as the direction opposite that shown in FIG. 1. The graph for the output voltage with a magnetic field in the same direction as that shown in FIG. 1 would be the same as that shown in FIG. 4, but in the third quadrant.

While the principles of the invention have now been made clear in the illustrative embodiment, there will be immediately obvious to those skilled in the art many modifications in structure, arrangements, proportions, and materials, used in the practice of the invention, and otherwise, which are particularly adapted for specific environments and operating requirements, without departing from those principles. The appended claim is therefore intended to cover and embrace any such modifications, within the limits only of the true spirit and scope of the invention.

What is claimed is:

An electromagnetic transducer comprising
    a body of semiconductive material having three contiguous portions, the center portion being of a given conductivity type, and the end portions being of an opposite conductivity type to form two parallel junctions.
    means for providing a direct current path through said center portion substantially parallel to said junctions, means for applying a variable magnetic field to said center portion which is perpendicular to the direct current path through said center portion,
    means connected to said two end portions for back-biasing a first portion of each of said junctions and for forward-biasing the remaining portions of said junctions, said back biased portions being equal to said forward biased portions in the absence of said applied magnetic field and being unequal in the presence of said field by an amount proportional to the flux density of said field, and
    a pair of output terminals connected to said end portions for deriving an output signal which is proportional to the flux density of the applied magnetic field.

References Cited by the Examiner

UNITED STATES PATENTS

| | | | |
|---|---|---|---|
| 2,695,930 | 11/1954 | Wallace | 307—88.5 |
| 2,943,269 | 6/1960 | Huang | 317—235 |
| 2,959,711 | 11/1960 | Levin | 317—235 |
| 2,980,860 | 4/1961 | MacDonald | 330—6 |
| 3,050,698 | 8/1962 | Brass | 307—88.5 |

JOHN F. COUCH, *Primary Examiner.*

A. D. PELLINEN, *Assistant Examiner.*